United States Patent [19]

Larson

[11] 4,335,634
[45] Jun. 22, 1982

[54] WEB SEVERING DEVICE

[75] Inventor: Clifford L. Larson, Marco Island, Fla.

[73] Assignee: Baldwin-Korthe Web Controls, Inc., Addison, Ill.

[21] Appl. No.: 264,216

[22] Filed: May 15, 1981

Related U.S. Application Data

[62] Division of Ser. No. 135,772, Mar. 31, 1980, Pat. No. 4,295,400.

[51] Int. Cl.³ .............................................. B26D 7/22
[52] U.S. Cl. .......................................... 83/13; 83/545
[58] Field of Search ................................. 83/544–546, 83/514, 515, 557, 600, 623, 690, 589, 13

[56] References Cited

U.S. PATENT DOCUMENTS

| | | | |
|---|---|---|---|
| 58,482 | 10/1866 | Riehl | 83/623 |
| 445,923 | 2/1891 | Carrer | 83/623 X |
| 3,081,659 | 3/1963 | Theobald | 83/623 X |
| 3,253,492 | 5/1966 | Petros et al. | 83/557 |
| 3,279,292 | 10/1966 | Beard | 83/623 X |
| 3,318,179 | 5/1967 | Elsas | 83/544 X |
| 3,901,112 | 8/1975 | Voswinckel | 83/600 X |
| 4,070,940 | 1/1978 | McDaniel | 83/464 |
| 4,086,111 | 4/1978 | Corey | 83/623 X |

FOREIGN PATENT DOCUMENTS 2085446 12/1971 France .

Primary Examiner—James M. Meister
Attorney, Agent, or Firm—Neuman, Williams, Anderson & Olson

[57] ABSTRACT

A web severing device has a pair of spaced-apart carriages straddling the path of the web, a severing blade being attached to one of the carriages. Power devices are provided for moving the carriages toward each other to bring the blade into severing contact with the web. Resilient devices are provided to prevent activation of the severing blade if a relatively rigid foreign object such as a human finger is accidentally embraced between the carriages and to prevent injury. When only the web is disposed between the carriages a portion of the resilient devices also functions to urge the blade-carrying carriage into web severing contact.

5 Claims, 5 Drawing Figures

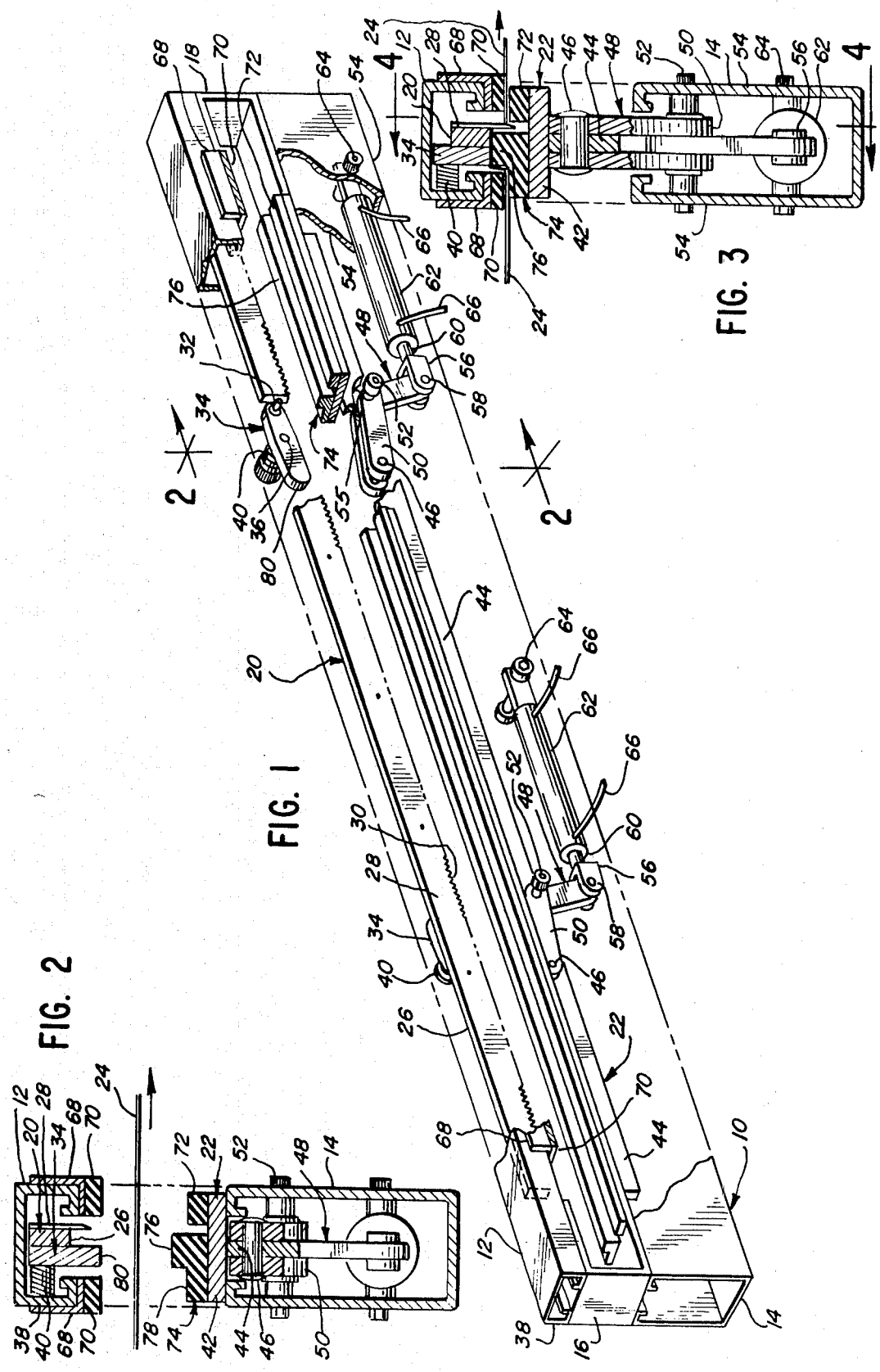

WEB SEVERING DEVICE

This is a division of application Ser. No. 135,772 filed Mar. 31, 1980, now U.S. Pat. No. 4,295,400.

This invention relates to a severing device for continuous webs, and more particularly to web severing devices suitable for use in high speed printing operations.

Web severing devices have long been used with high speed printing presses. Should a web break during the printing operation, such presses, because of their speed, usually cannot be stopped fast enough to avoid damage to the press caused by continuing high speed travel, web wrap-up or web backlash. Web severing devices typically serve to sever the web quickly and entirely at one or more locations along the path of travel of the web whereby torn web segments cannot continue through the press. Such devices generally include a cutting blade disposed transversely to the path of travel of the web, and operable in a guillotine or rotary mode, when activated, to sever the web. Activation of the devices to sever the web is effected by manual switching by an operator, or remotely and automatically in response to control signals generated by one or more web break detectors and/or other sensing devices at locations along the path of travel of the web.

Although such devices (see e.g. U.S. Pat. No. 3,272,049) may operate satisfactorily to sever the web when called upon to do so, they potentially can present substantial safety hazards to the personnel near the presses. Whether or not the presses themselves are operating, inadvertence or carelessness of operating personnel, or malfunctioning of control equipment, may result in serious injury if the web severer is activated when a hand or finger is disposed in the path of the web cutting blade.

Accordingly, a primary object of this invention is to provide a web severing device which provides full and consistent personnel safety and which at the same time is fully effective to sever the web quickly and entirely at any web speed.

Another object of the invention is to provide a web severing device which cannot be activated into severing action while any relatively non-flexible, rigid foreign object such as a human finger or hand is in the path of the cutting blade, and which will not seriously injure any human part if it is caught in said path.

A further object of this invention is to provide a web severing device which is capable of cutting a taut web and which is not dependent on the motion of the web to fully sever the taut web.

A still further object of the invention is to provide a web severing device capable of positively clamping the tail of the web across the entire width of the device.

A still further object of the invention is to provide a web severing device which resets itself for subsequent cutting after each severing operation.

Yet another object of this invention is to provide a web severing device which is compact and economical in its construction, operation and maintenance.

It is also an object of this invention to provide a web severing device which may be conveniently and easily operated on a printing press or the like, and which may be responsive to signals from a web break detector in the event of detection of a web break.

Other objects of the invention will become apparent from the following detailed description including the drawings, in which:

FIG. 1 is a perspective view, partially broken away, illustrating one embodiment of the web severing device of the present invention.

FIG. 2 is an enlarged sectional view taken along the line 2—2 of FIG. 1 and showing certain of the movable elements of the device in inactive positions.

FIG. 3 is a sectional view similar to FIG. 2 but showing certain of the movable elements of the device in active web severing positions.

Figure 4:
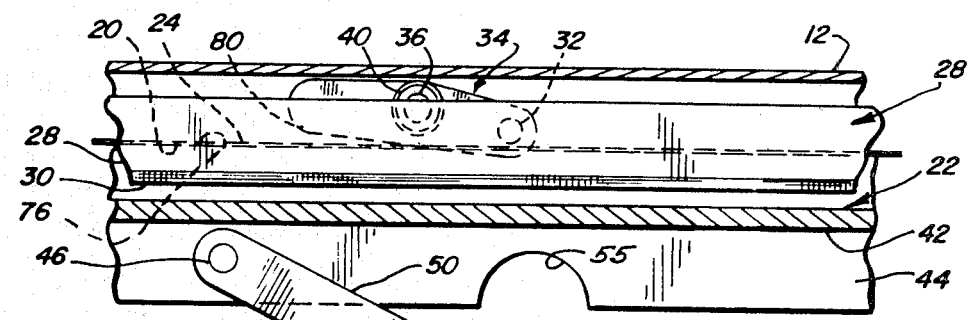
FIG. 4 is a fragmentary, enlarged sectional view taken along the line 4—4 of FIG. 3.

With particular reference to FIG. 1 the web severing device of the invention comprises a housing 10 which has an upper channel member 12 and a lower channel member 14 which are disposed and secured in opposed spaced-apart parallel relationship by a pair of end channel members 16 and 18. Within the housing 10 there are provided a pair of generally parallel spaced-apart elongated carriages 20 and 22 positioned transverse to the direction of travel of the web 24 (see arrow, FIG. 2) and straddling the path of the web so that the web passes between the carriages. The upper carriage 20 consists of an elongated bar member 26 having secured thereto on one side an elongated blade 28 provided with sharp serrations 30 along the lower edge thereof for severing the web when the device is activated. The upper carriage 20 is pivotally supported within the housing 10 for movement of the upper carriage in a vertical path transverse to the path of the web. The upper carriage 20 is pivotally secured near each end thereof by pins 32 (FIGS. 1 and 4) to one end of each of a pair of pivot links 34, the pivot links 34 being in turn pivotally supported on pins 36 extending inwardly from one side 38 of the upper housing channel 12. Torsion springs 40 are interposed on the pins 36 between the pivot links 34 and upper channel member 12 whereby the pivot links 34 are biased in a counter-clockwise direction (FIG. 1) so that the blade-carrying upper carriage 20 is normally maintained in the inactive position shown in FIGS. 1 and 2.

As seen best in FIGS. 2 and 4 the lower carriage 22 is T-shaped in cross section, having a horizontal portion 42 and a vertical portion 44. The lower carriage 22 is also pivotally supported for movement in a vertical path transverse to the path of travel of the web 24. Near each end thereof the vertical portion 44 of the lower carriage 22 is pivotally secured and supported by a pair of pins 46 which are in turn pivotally supported by bifurcated portions 50 of bell crank levers levers 48, (FIGS. 1 and 3). The bell crank levers 48 are pivotally supported centrally thereof on pins 52 extending between the opposed vertical side portions 54 of the lower channel member 14. Slots 55 are provided in the vertical portion 44 of the lower carriage 22 to accommodate the pins 52 when the lower carriage is maintained in its normal lower inactive position. A pair of yokes 56 are pivotally connected to the other ends of levers 48 by means of pins 58. The yokes 56 are secured to the exterior ends of pistons 60. The opposite ends of the piston and cylinder assemblies 62 are pivotally secured to and supported on pins 64 which extend between the vertical side portions 54 of the lower channel member 14. Air or other suitable fluid is supplied to, or exhausted from, the cylinders 62 through lines 66.

While the piston and cylinder assemblies 62, as shown, are double acting, it should be understood that single acting piston and cylinder assemblies may also be employed, in which event springs (not shown) internally of the cylinders normally bias the pistons in the direction to maintain the lower carriage 22 in its lower inactive position, and air or other fluid under pressure is employed to move the pistons against the bias of the springs to raise the lower carriage 22.

The supply of air or other fluid to the cylinders 62 may be controlled by a solenoid valve (not shown) in such a fashion that the pistons 60 within the cylinders 62 always operate in the same direction and at the same speed so as to raise or lower both ends of the lower carriage 22 at the same rate. It should be understood that the solenoid valves may be controlled manually or by signals generated by and received from one or more web break detectors (not shown) located along the path of travel of the web. Also, although the piston and cylinder assemblies 62 constitute one type of power means for raising and lowering the lower carriage 22, it should be understood that other power means are equally suitable for accomplishing the same functions. One such alternative power means includes electrically activates solenoid units connected through appropriate linkage to the lower carriage 22 for movement thereof in a vertical path.

While the upper carriage 20 and lower carriage 22 are shown to be supported, respectively, on only a pair of pivot links 34 and only a pair of power-operated bell crank levers 48, it should be noted further that for use with continuous webs of substantial width it may be desirable or necessary to support the respective carriages on three or more pivot links 34 and bell crank levers 48 to provide sufficient support for the carriages and sufficient power for proper operation of the web severing device.

As seen in FIGS. 1 and 2, a pair of metallic angle members 68 is secured to the sides of the upper channel 12. To the horizontal portions of the angle members 68 are secured (as by gluing, bonding or other fastening means) a pair of elongated, relatively hard, resilient members 70 which extend transversely across the entire width of the path of travel of the web 24. It should be noted that the resilient members 70 are spaced-apart in the direction of travel of the web 24 and straddle the pivot links 34, upper carriage 20 and path of travel of the blade 28 for a purpose to be described hereinbelow. The resilient members 70 are substantially identical and extend equal distances downwardly from the upper channel member 12.

In a similar fashion relatively hard, resilient members 72 and 74 are secured to the top surface of the lower carriage 22 (as shown in FIGS. 1, 2 and 3). The resilient members 72 and 74 similarly extend transversely across the full width of the travel path of the web 24. The elongated elements 72 and 74 are spaced-apart in the direction of travel of the web 24 so as to straddle the path of movement of the severing blade 28 (FIG. 3). The elongated member 72 is at least partially aligned in the direction of travel of the web with the elongated resilient member 70 which is directly opposed thereto to the upper channel 12. The elongated resilient member 74 has a protruding portion extending the length thereof to provide for a raised upper surface 76 and a lower upper surface 78 (FIG. 2) across the full width of the resilient member 74. The surface 78 is substantially co-planar with the upper surface of the resilient member 72. The surface 78 of resilient member 74 is at least partially aligned in the direction of travel of the web with the other opposed resilient member 70 on the upper channel 12. The upper surface 76 of the resilient member 74 is aligned in the direction of travel of the web with the surfaces 80 of the pivot links 34 for a purpose that will be hereinafter described. A portion of the upper surface 76 of the resilient member 74 is also in alignment in the direction of travel of the web with a portion of the elongated carriage member 26.

Operation of the device of the invention so as to move the web severing blade 28 from its inactive position (FIGS. 1 and 2) to its web severing position (FIGS. 3 and 4) will now be described. In response to either manual or automatic control, the cylinder assemblies 62 are simultaneously activated to move the pistons 60 thereof further out of the cylinders. This piston movement causes the bell crank levers 48 to pivot in a clockwise direction (FIG. 1) whereby the lower carriage 22 is caused to raise to close the gap between the lower and upper carriages 22 and 20. As this gap is narrowed the protruding portion 76 of the resilient member 74 contacts the lower surfaces 80 of the pivot links 34 (with the web 24 therebetween) whereby the protrusion 76 acts as a cam upon the surfaces 80, which function as cam followers, to rotate or pivot both of the pivot links 34 uniformly in a clockwise direction (FIG. 1) to lower the upper blade-carrying carriage 20 into a web severing path of motion. On completion of the web severing stroke (see FIG. 3) the protruding portion 76 of the resilient member 74 has been raised to a point where the tail of the web is firmly gripped between the protruding portion 76 and the metallic upper carriage member 20. It should be noted that the entire web severing operation as just described occurs almost instantaneously upon activation of the cylinders 62.

After the web severing step is completed the several movable elements of the device are returned to their inactive (normal operating) positions by causing the pistons 60 to move in the opposite direction whereby the levers 48 pivot in a counterclockwise direction to lower the lower carriage 22. At this occurs the protruding portion 76 of the resilient member 74 on the lower carriage 22 ultimately moves out of contact with the pivot links 34 at which time the torsion springs 40 cause the pivot links 34 to pivot in a counterclockwise direction to raise the blade-carrying upper carriage 20 into its inactive position (FIGS. 1 and 2).

Figure 5:
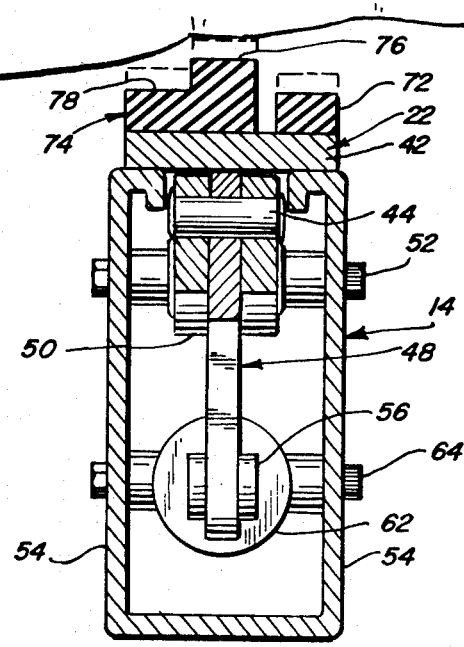
FIG. 5 is an enlarged sectional view similar to FIG. 2, but also showing certain elements of the device in intermediate (dotted) positions and embracing a human finger inserted through the device in the travel path of the web (not shown).

An important safety feature of this invention may best be described with reference to FIG. 5. Should a foreign object such as a human finger or hand be accidentally positioned in the path of travel of the severing blade 28, even though the severing action has been called for by manual or remote control activation of the cylinder assemblies 62, the relative rigidity of the foreign object of finger, together with the positioning and resiliency of the elongated members 70, 72 and 74 serve both to protect the finger from serious or substantial injury while gripped therebetween as well as to preclude final activation or movement of the severing blade 28 in its path of travel. If the lower carriage 22 is caused to be raised while a finger is interposed in the path of travel of the blade 28, the protruding portion 76 of the resilient member 74 (dotted position) contacts the finger and the finger is gripped between the protruding member 76 and the resilient members 70 on the upper channel 12.

Because of the resiliency of these members the compressive forces acting on the finger are insufficient to result in any serious or substantial injury to the finger. More importantly, interposition of the relatively rigid finger prevents the protruding portion 76 of the resilient member 74 from camming the pivot links 34 against the bias of the torsion springs 40 and thus prevents the upper carriage 20 from moving into a severing position. By this construction the severing blade 28 is prevented from moving in the direction of the finger while the latter is disposed in its path. Of course, before the finger is removed from its gripped position the lower carriage 22 should be lowered to its initial inactive position.

It should be further noted that the resiliency or hardness of the resilient members 70, 72, and 74 should be such that said members will yield sufficiently under compression to prevent serious injury to a finger or hand and at the same time be sufficiently hard to permit the protrusion 76 to cam the pivot links 34 against the bias of the springs 40 to complete the web severing operation when no finger, hand or other rigid object is interposed. It has been found that said resilient members perform their functions satisfactorily when made of neoprene and have a hardness on the order of 60 durometer.

While particular embodiments of the invention have been described, it will be understood, of course, that the invention is not limited thereto since many modifications may be made, and it is therefore contemplated to cover any such modifications as fall within the true spirit and scope of the invention.

What is claimed is:

1. A process for severing a continuous web having a path of travel between a pair of parallel spaced-apart first and second carriages disposed transversely to said web and straddling the path of said web, only said first carriage carrying a severing blade, which process comprises moving said second carriage in one direction in a plane substantially perpendicularly to said web path and toward said blade-carrying first carriage to narrow the spaced-apart distance between said carriages without moving said first carriage, preventing further movement of said second carriage in said one direction during any period of time in which a relatively non-flexible, rigid object such as a human finger is disposed between said carriages, and thereafter by further movement of said second carriage in said one direction causing said blade-carrying first carriage to be moved in the opposite direction toward said web path whereby said blade is moved into severing contact with said web.

2. A process for severing a continuous web having a path of travel between a pair of parallel spaced-apart first and second carriages disposed transversely to said web and straddling the path of said web, only said first carriage carrying a severing blade, which process comprises pivotally moving said second carriage in one direction in a plane substantially perpendicularly to said web path and toward said blade-carrying first carriage to narrow the spaced-apart distance between said carriages without moving said first carriage, preventing further pivotal movement of said second carriage in said one direction during any period of time in which a relatively non-flexible, rigid object such as a human finger is disposed between said carriages, and thereafter by further pivotal movement of said second carriage in said one direction causing said blade-carrying first carriage to be moved in the opposite direction toward said web path whereby said blade is moved into severing contact with said web.

3. A process for severing a continuous web having a path of travel between a pair of parallel spaced-apart first and second carriage disposed transversely to said web and straddling the path of said web, only said first carriage carrying a severing blade, which process comprises moving said second carriage in one direction in a plane substantially perpendicularly to said web path and toward said blade-carrying first carriage to narrow the spaced-apart distance between said carriages without moving said first carriage, preventing further movement of said second carriage in said one direction during any period of time in which a relatively non-flexible, rigid object such as a human finger is disposed between said carriages, and thereafter by further movement of said second carriage in said one direction causing said blade-carrying first carriage to be pivotally moved in the opposite direction toward said web path whereby said blade is moved into severing contact with said web.

4. A process for severing a continuous web having a path of travel between a pair of parallel spaced-apart first and second carriages disposed transversely to said web and straddling the path of said web, only said first carriage carrying a severing blade, which process comprises pivotally moving said second carriage in one direction in a plane substantially perpendicularly to said web path and toward said blade-carrying first carriage to narrow the spaced-apart distance between said carriages without moving said first carriage, preventing further pivotal movement of said second carriage in said one direction during any period of time in which a relatively non-flexible, rigid object such as a human finger is disposed between said carriages, and thereafter by further pivotal movement of said second carriage in said one direction causing said blade-carrying first carriage to be pivotally moved in the opposite direction toward said web path whereby said blade is moved into severing contact with said web.

5. A process for severing a continuous web having a path of travel between a pair of parallel spaced-apart pivotally supported first and second carriages disposed transversely to said web and straddling the path of said web, only said first carriage carrying a severing blade and said first carriage being spring biased against pivotal movement toward said second carriage, which process comprises pivotally moving said second carriage in one direction in a plane substantially perpendicularly to said web path and toward said blade-carrying first carriage to narrow the spaced-apart distance between said carriages without moving said first carriage, preventing further pivotal movement of said second carriage in said one direction during any period of time in which a relatively non-flexible, rigid object such as a human finger is disposed between said carriages, and thereafter by further pivotal movement of said second carriage in said one direction causing said blade-carrying first carriage to be pivotally moved against said bias in the opposite direction toward said web path whereby said blade is moved into severing contact with said web.

* * * * *